(12) United States Patent
Velliky (10) Patent No.: US 7,279,225 B2
(45) Date of Patent: Oct. 9, 2007

(54) POLYMER-COATED METAL STRIP AND METHOD OF PRODUCTION

(76) Inventor: James E. Velliky, 1401 Gilmore Dr., Clairton, PA (US) 15025

( * ) Notice: Subject to any disclaimer, the term of this patent is extended or adjusted under 35 U.S.C. 154(b) by 0 days.

(21) Appl. No.: 10/233,369

(22) Filed: Aug. 31, 2002

(65) Prior Publication Data
US 2003/0152788 A1   Aug. 14, 2003

Related U.S. Application Data

(60) Provisional application No. 60/356,653, filed on Feb. 14, 2002.

(51) Int. Cl.
*B32B 15/04*   (2006.01)

(52) U.S. Cl. .............. 428/461; 428/457; 427/209; 427/211

(58) Field of Classification Search ............. 428/457, 428/461, 458; 156/244.23, 244.24
See application file for complete search history.

(56) References Cited

U.S. PATENT DOCUMENTS

| | | | | |
|---|---|---|---|---|
| 3,140,196 A | * | 7/1964 | Lacy et al. ............... | 428/215 |
| 3,451,871 A | * | 6/1969 | Zeppelzauer et al. .. | 156/244.16 |
| 3,642,567 A | * | 2/1972 | Rogers, Jr. .............. | 428/334 |
| 5,248,364 A | * | 9/1993 | Liu et al. ................ | 156/244.11 |
| 5,407,702 A | * | 4/1995 | Smith et al. ............. | 427/211 |
| 5,674,633 A | * | 10/1997 | Saunders et al. ......... | 428/623 |
| 5,736,086 A | * | 4/1998 | Jones et al. ............ | 264/171.17 |
| 5,919,517 A | * | 7/1999 | Levendusky et al. ...... | 427/211 |
| 5,985,080 A | * | 11/1999 | Kobayashi et al. ..... | 156/244.24 |
| 6,110,599 A | * | 8/2000 | Edwards et al. .......... | 428/461 |
| 2001/0009718 A1 | * | 7/2001 | Sinsel et al. ............ | 428/332 |
| 2002/0114884 A1 | * | 8/2002 | Friedersdorf et al. ..... | 427/195 |

* cited by examiner

*Primary Examiner*—Monique R. Jackson (57) ABSTRACT

The present invention provides for a polymer metallic strip and an improved rapid process for the continuous extrusion coating layer of the surface of a metal strip. The present invention provides for moving a metal strip by a multiplicity of rolls, pre-treating at least one and perhaps both sides of the metal strip using an oxidizing flame, coating layer the pre-treated strip surface(s) with a liquid primer, drying the primer, and activating the primer with an oxidizing flame, and or an oven and/or a corona discharge. The primed, activated, metal strip is then extrusion coated with a polymeric extrudate, passed over a temperature-controlled, chilled roll of a specific surface roughness to achieve the desired surface properties wherein such steps are performed with an edge containment system. The activation and extrusion coating layer steps may be repeated to coat the second side. Further, one may optionally subsequently re-heat the coated strip to about the polymeric melting temperature and follow such reheating with a rapid quench or a stepped surface quench followed by a rapid quench.

21 Claims, 6 Drawing Sheets

Figure 1

Figure 2(c)
Flame treat second side

Figure 2(b)
Flame treat two sides

Figure 2(a)
Flame treat first side

Figure 3(a)
Prim first side, dry

Figure 3(b)
Prime second side, dry

Figure 3(c)
Dip Prime, dry

Figure 3(d)
Spray Prime, dry

Figure 4(a)
Corona treat first side

Figure 4(b)
Flame and Corona treat first side

Figure 4(c)
Corona treat second side

Figure 4(d)
Flame and Corona treat second side

Figure 5(b)
Extrusion coat second side

Figure 5(a)
Extrusion coat first side

Figure 8
Reflow, stepped surface quench, full quench

Figure 7
Reflow, surface quench, full quench

Figure 6
Reflow, full quench

US 7,279,225 B2

POLYMER-COATED METAL STRIP AND METHOD OF PRODUCTION

This application claims priority from U.S. application Ser. No. 60/356,653 filed Feb. 14, 2002, entitled "An Improved Process for Producing a Polymer Coated Metallic Strip and The Deformable Coated Products Thus Produced".

FIELD OF THE INVENTION

The present invention relates to a unique, rapid process for fabricating a polymer-coated strip metal and a unique polymer-coated strip metal, and more specifically for polymer coating layer and process that improves adherence of the polymer to the substrate metal using a flame, primer, oven dryer and edge containment extrusion systems.

BACKGROUND

Many in the field of coated steel products have attempted to provide a pre-coated strip to high speed metal forming operations resulting in finished or semi-finished formed products with functional coating layers which may or may not require further treatment or processing to provide final coating layer performance characteristics. The oldest and probably the best known method which has been in use for many years to provide such coated strips for various applications involves the use of a coil coating layer process in which a liquid paint or coating layer is applied to a moving strip by transfer of the liquid from a reservoir to a roll and finally to the surface of the metal strip. After a coating layer is applied, the coated strip is transported through an oven in which the coating layer is cured, a process whereby the coating layer is polymerized or cross-linked to give final coating layer attributes while removing carrier solvents which were part of the initial coating layer system.

Polymers used in these applications typically have been restricted to thermoset resins which have relatively narrow fields of application. Consequently, depending on the specific intended application, a number of such resins may be required. These existing processes are extremely environmentally unfriendly and generate large amounts of volatile organic compounds from the applied coating layers during the cure cycle. Accordingly, facilities using these processes require significant hazardous waste handling capabilities.

Since the early 1970's, a number of processes involving lamination have been proposed as possible alternative approaches for producing coated metal strip which processes eliminate or reduce many of the environmental factors associated with coil coating layer. One of the first known processes is described in U.S. Pat. No. 3,679,513 (1972) which describes a lamination process for applying a polyethylene film to a metal strip by heating the metal strip to a temperature above the melting point of polyethylene film and passing this heated strip along with the polyethylene film through a set of nip rolls whereby the plastic film interacts with the metal surface to effect good adhesion. From this point, the coated metal strip passes through a "post heating zone" for development of final coating layer attributes.

In 1985, in U.S. Pat. No. 4,517,255, a process was described for the production of metal sheet with a polyester resin film laminate again using a pre-heated strip followed by application of the polyester film by nip rolls with no further post-treatment of the coated metal strip. The thermoplastic polyester films used were either crystalline or oriented depending on the intended application of the resulting product.

During the 1990's, a number of U.S. Patents were issued to Heyes et. al. involving the production of polymer metallic strip laminates (See U.S. Pat. No. 5,059,460 (1991), U.S. Pat. No. 5,093,208 (1992), U.S. Pat. No. 5,238,517 (1993), U.S. Pat. No. 4,957,820 (1990), U.S. Pat. No. 4,980,210 (1990), U.S. Pat. No. 5,149,389 (1992), and U.S. Pat. No. 5,318,648 (1994)). All of these patents are based on the use of pre-heated metal strip to which is applied various thermoplastic polymers and polymer combinations using nip rolls followed by post-heating and water quench. Processing differences include various pre-heat temperatures, post-heat temperatures, delay times before quench, and quench temperatures. Various thermoplastic polymers and polymer combinations are claimed by Heyes et.al. along with coating layer functionality and attributes resulting from the various means of processing.

Similar patents were also granted to Tanaka et. al. (U.S. Pat. No. 5,330,605 (1994)), Newcomb et. al. (U.S. Pat. No. 5,679,200 (1997)), Sakamoto et. al. (U.S. Pat. No. 6,017,599 (2000)), Yasunaka et. al. (U.S. Pat. No. 6,080,260 (2000)), and Kaguma et. al. (U.S. Pat. No. 6,164,358 (2000)), which all describe similar processing technology as those described above with unique variations of process parameters to yield coated products with specific performance characteristics.

All of the lamination processes described thus far have involved lamination of pre-cast thermoplastic films, produced in a first and separate step using well-known extrusion film casting technology, before application to a hot metal strip. In 1990, Gregory (U.S. Pat. No. 4,941,935) described a process for coating layer aluminum foil or paper/aluminum foil laminate using a direct co-extrusion process. Coating layer co-extruded using this technique consisted of a layer of olefin terpolymer and a layer of polypropylene, the olefin terpolymer being adjacent to the substrate and the polypropylene being adjacent to the olefin terpolymer.

Subsequently, U.S. Pat. No. 5,407,702 (1995) disclosed a direct extrusion coating layer process for coating layer both sides of a metal strip, such as aluminum alloy strip, which is moved through a pre-conditioner, two extrusion dies, a post heater, and finally a cooling system. Both sides of the strip are coated with thin coating layers of polyester material. The resulting coated strip is useful for containers, such as cans and can ends, as well as for automobiles, appliances, aerospace, construction, and electrical devices. This patent was followed by U.S. Pat. No. 5,919,517 (1999) in which Levendusky et. al. disclosed a method and apparatus for coating layer both sides of a metal strip, such as aluminum alloy strip. The teachings in this patent are essentially identical to those in U.S. Pat. No. 5,407,702 except no post-heating or post-treating is required after extrusion application of the coating layer(s).

Finally, Schmid et.al. disclose in U.S. Pat. No. 5,942,285 (1999) a method for extrusion coating layer a metal substrate, solid extrusion coating layer compositions for metal substrates, and a metal article. The extrusion coating layer composition is a thermoplastic material and comprises: (a) a polyester having an average molecular weight of about 10,000 to about 35,000, and (b) a modifying resin, such as an epoxy resin having an epoxy equivalent weight of about 500 to about 15,000. The extrusion coating layer composition is applied to a metal substrate in an extrusion process to provide a composition film having a thickness of about 1 to about 40 microns.

Although many of the prior art methods provide coated metal strip or sheet, many of them require the formation of a film for lamination before application to the metal substrate. Further, many of these methods which provide direct coating layers onto a metal substrate using an extrusion coating layer process do not provide a continuous process for strip coating layer which operates from uncoiler to coiler. Others do not have the features or characteristics of ultra rapid deposition of the coating layer and in particular do not possess an edge containment system which allows rapid deposition of a broad range of resins. Further, many do not provide an applied coating layer with chemical and physical properties comparable to those of laminate coated products and in particular do not describe a process in which a priming step is used as part of that process to improve adherence of such coating layer.

Accordingly, it is an object of the present invention to provide a method for the continuous coating layer of metal strip, particularly of various types of metal strip, with a thermoplastic resin coating layer in which many different polymeric resins can be applied at ultra high speeds on a metal substrate. It is the further object of the present invention to provide a method for coating layer a metal strip from uncoiler to coiler at relatively high speed with uniformity of coating layer thickness and consistency of texture and color. It is also an object of the invention to provide for a method of continuous coating of a metal strip which employs an edge containment system. Finally, it is the object of the present invention to provide a metal composite comprising a metal strip having a primer coating layer along with a tightly adhered uniform thermoplastic coating layer with defined crystallinity after post-treatment using a controlled quench process to achieve required chemical and physical properties of the resulting coating layer. Other advantages of this invention will become apparent with the detailed description herein.

SUMMARY OF THE INVENTION

The present invention comprises a polymer-coated metal strip and a new and improved process for producing a polymer-coated metal strip. The first step in the process, following uncoiling of the metal strip, consists of pre-treatment of the metal strip surface using an oxidizing flame treater. Either one oxidizing flame treater is used to treat one side of the metal strip, or dual oxidizing flame treaters are used to treat both sides of the metal strip, depending in whether a primer coat is to be applied to one side or both sides of the strip in the subsequent step to insure surface decontamination, then preheating the strip depending upon the polymeric resin being deposited.

In one embodiment, after flame pre-treatment, a thin primer coat is applied to one side of the pre-treated metal strip using a standard, single stage transfer roller coating layer method. In another embodiment, thin primer coats are applied to both sides of the pre-treated metal strip using either a standard, two-stage roller coating layer method, a dip-and-squeegee technique, or a spray-and-squeegee technique, or an air suspension system. Specific primer coating layers used in these operations consist of water soluble, dried-in-place systems wherein such systems may include a cleaning tank, a primer basin which deposits a thin layer of initial coating layer and an air suspension system wherein a strip is suspended with air blowers as primer is applied to maintain the pristine nature of the surface and reduce potential exterior containments. These primers are well known and are used to promote adhesion between the metal surface and subsequently applied polymer coating layer and inhibit corrosion at the metal surface polymer interface.

After application of the primer coat to either one or both sides of the metal strip, one primed side of the metal strip is activated using either an oxidizing flame treater only, or a combination of an oxidizing flame treater and preheat followed by application of a Corona discharge to prepare the primer coat surface to accept a polymer coating layer.

Polymer coating layer, for example polypropylene, is applied to the activated prime coated metal strip by a die which is fed by extruder(s) and which preferably is located just after a nip roll on the processing line. Extruders can be of a typical single screw or plurality of screw design that is well known in the art. Extruders are sized to deliver various combinations of polymers, e.g., polypropylene, polypropylene plus grafted maliec anhydride, polypropylene plus coloration pigments, in discrete polymer layers to achieve final polymer coating layer chemical and physical attributes. In a preferred embodiment, to accommodate deposition of the polymer-coating layer at rapid speeds, the extruders have an edge containment system. Extrusion temperatures will vary depending upon the resin used for the coating layer, coloration pigments admixed to provide a colored coating layer, etc., but generally are in the range of 450° to 600° F.

Immediately following the edge containment/extruder/die system is a chill roll maintained preferably at a temperature substantially less than the extrudate temperature and wherein the chill roll has a surface finish which provides the desired final surface appearance of the coating layer in those cases in which the coated product will meet defined performance criteria with no further processing. For example, in high-speed operations, e.g., 400 to 3,000 feet per minute, temperatures of from about 150° to 170° F. are preferred for polypropylene.

In those embodiments involving a two stage coating layer process, the other side of primed metal strip is treated with an oxidizing flame only, treated with a Corona discharge only, or treated with a combination of an oxidizing flame followed by a Corona discharge to activate the second primed surface. The second side of activated primed metal strip is then extrusion coated using a second edge containment/extruder/die arrangement along with a second nip/roll/chill roll arrangement.

In those cases where the one-side coated and/or the two-side coated metal strip will not meet the final desired performance criteria, such as adhesion characteristics and formability requirements, the coated metal strip is passed through a heater, such as an induction oven, to re-melt the polymer coating layer. In one embodiment, the metal strip with the re-melted coating layer is fully quenched after at least a one second delay by passage through a laminar flow fluid at a temperature ranging from approximately 60° F. to 120° F. with quench temperature dependent on the type of polymer. The strip can then be dried and gauged before recoiling or subjected to further processing, such as treatment with Corona discharge, to enhance the surface for printing decorative or functional ink imprints.

In another embodiment, the strip with the re-melted coating layer exiting the reheat oven is subjected to film surface quenching by passing the strip over a series of prior chilled rolls followed by a full quench through a laminar flow fluid at 60° F. to about 120° F. followed by drying and recoiling or by further processing.

Other advantages of the improved processes of the present invention will be apparent to one skilled in the art by reading the following detailed description of presently preferred embodiments taken in connection with the accompanying drawings, which embodiments and drawings are provided for purposes of illustration and not limitation.

PREFERRED EMBODIMENTS

The present invention comprises a processing line 10 having an uncoiler 12 for uncoiling a strip 11 of metal, e.g., steel, chromium-coated steel, tinplate, hot dip galvanized steel, etc. See FIG. 1. The steering and bridle rolls associated with this line are not described or discussed in detail as they are not part of the present invention and are well known by those skilled in the art.

Example 1

Figure 2A:
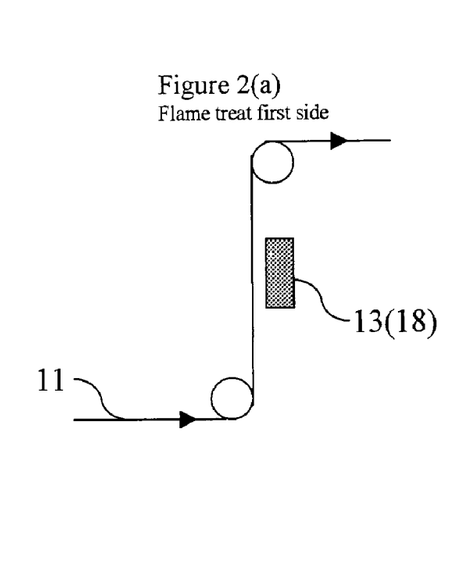
FIGS. 2(a), 2(b) and 2(c) reflect preferred embodiments of a step in the process in which a first side of a metal sheet is flame treated first, flame treating both sides of a metal sheet, and flame treating the second side of a metal sheet respectively.

Following uncoiler 12, one side of the strip is pre-treated using a single flame treater 13 positioned with the flame head at a position 1 to 4 inches from the strip at preferably 90° to the strip surface. See FIG. 2a. Flame treater 13 is operated with a plasma value between 32 and 45 but preferably between 37 and 42 at strip speeds up to 500 ft/min. with higher values being employed at higher strip speeds.

After pre-treatment, strip 11 enters a primer station in which a liquid primer coat, preferably water based, is applied to the pre-treated side of the strip by transfer of the liquid coating layer from storage container 15 to the pre-treated side of strip II by way of a gravure cylinder or smooth roll applicator 16/impression roll 17 arrangement followed by ambient or hot air or oven drier 17a. See FIG. 3a. The amount of thin liqiuid primer coat applied in this manner ranges between 1.5 and 7.5 mg/ft$^2$ but preferably between 3 and 5 mg/ft$^2$. Water based primers used in this application include polyethylenimine, polyethylene acrylic acid, ethylene vinyl actetate, polyvinylidene chloride, polyacrylics, polyesters, polyurethanes, organofunctional amines, and polyamides. The liquid primer can also contain a corrosion inhibitor, such as an organo-chromium compound to prevent oxidation at the metal/primer interface during further processing of the coated metal strip.

Figure 4A:
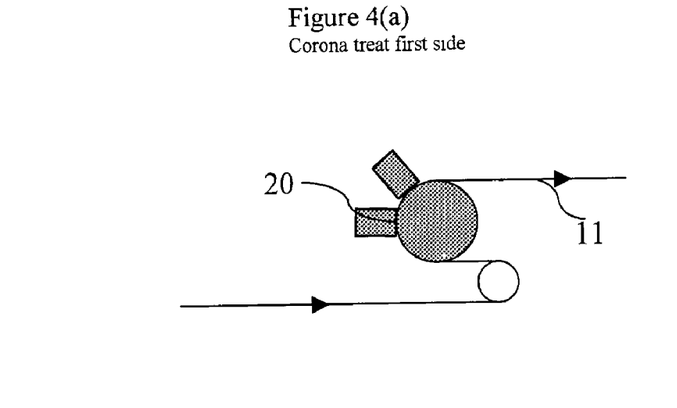
FIGS. 4(a), 4(b), 4(c) and 4(d) respectively reflect preferred embodiments of a step in the process in which a first side of a metal sheet is Corona treated, a first side of a metal sheet is flame and Corona treated, a second side of a metal sheet is Corona treated, and a second side is flame and Corona treated.
Figure 4B:
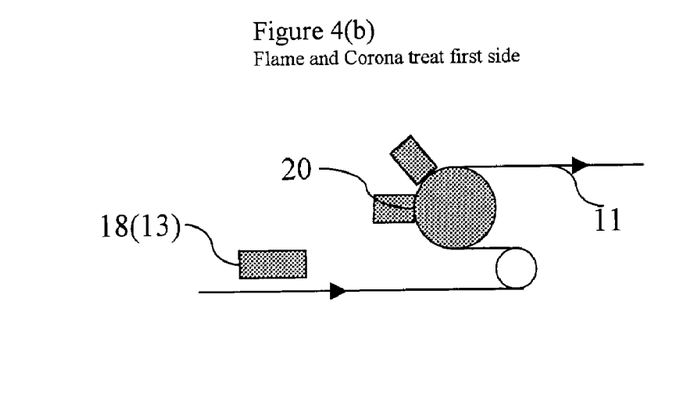

Following the primer station, the primer coat is activated by subjecting the primed side of the strip to (a) flame treater 18 using the same conditions as described above for pre-treatment (See FIG. 2a), and or an oven (b), Corona discharge 20 operated between 5 to 30 watts/ft$^2$/min but preferably about 6 watts/ft$^2$/min (See FIG. 4a), or (c) a combination of flame treater and oven 18 followed by Corona discharge 20 used in tandem (See FIG. 4b) for rapid, i.e., up to 3,000 ft/min deposition rates of resins.

After activation of the primer coat, strip 11 is positioned so that the activated primed surface is juxtaposed to extruder(s) 22 having die 23 for extruding the melted polymer(s) on to the primed and activated strip surface. See FIG. 5a. When entering the extruder/die area, the strip must be at least 250° F. to allow for rapid deposition. Die 23 is positioned so that the melt curtain exiting the die drops vertically into the nip area between the moving strip 11 and chill roll 24 such that the melt film contacts the moving strip at about the same time as it contacts the chill roll. In one preferred embodiment, which is even more preferred for the deposition of PET, the extruder(s) has an edge containment system to stabilize the polymeric curtain for deposition rates of 900 to 3,000 ft/min. In this embodiment, the chill roll 24 consists of a highly polished chrome coated steel roll which imparts final desired surface attributes to the resulting extrusion coating layer. For example, a chill roll with Ra values between 2 uin and 10 uin but preferably 2 uin-4 uin will result on a bright, shiny extrusion coating layer surface.

Figure 5A:
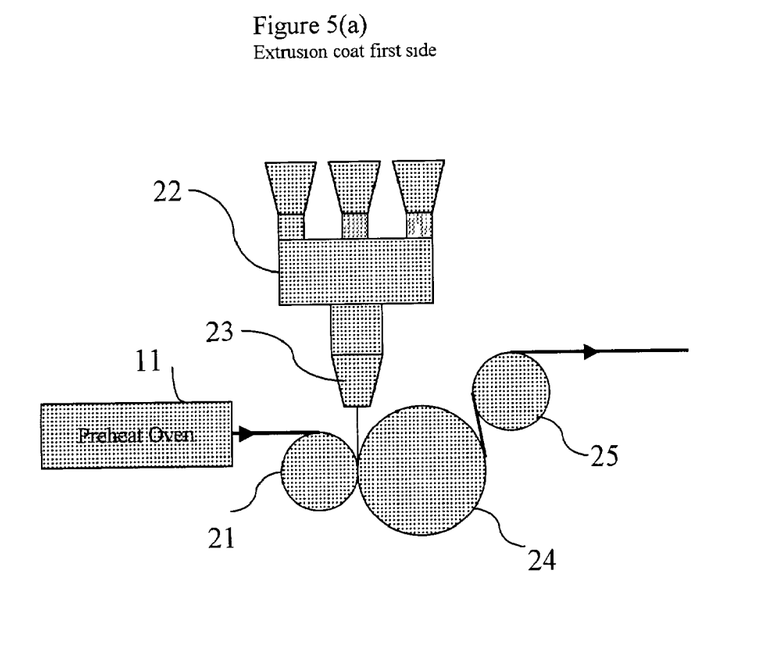
FIGS. 5(a) and 5(b) respectively reflect preferred embodiments of a step in the process in which a first side of a metal sheet is extrusion coated and a second side of a metal sheet is extrusion coated.

Nip roll 21 defines the strip/chill roll nip area and applies sufficient pressure to the moving strip to ensure the melt film contacts with the moving strip. This nip roll can be either a chrome-coated steel roll or a rubber-coated steel roll with any number of rubber coating layer types but preferably neoprene with a hardness between 80 and 90 durometer but preferably 85-90.

After exiting chill roll 24, the moving strip II moves around a stripper roll 25 which removes the coated strip from the chill roll after the melted coating layer is initially cooled by chill roll 24. The temperature of chill roll 24 is maintained between 60° and about 190° F. but preferably between 150° and 170° F. for polypropylene polymer leaving die 23 at a temperature between 450° F. to about 600° F. when using polypropylene. These later two temperature ranges will depend on the particular resins used.

Extruder 22, designated in FIG. 5(a) comprises at least one or more single screw extruders, well known to those familiar with the art, with accompanying hoppers and material feed systems. In an even more preferred embodiment, the extruder has an edge containment system to prevent splattering in that would otherwise afflict rapid deposition rates. The three hoppers shown in FIG. 5 depict one embodiment in which three extruders with three material feed systems for providing such additional components such as a pigment concentrate for coloration of the coating layer, or polymers or copolymers either alone or as carriers for other components. Polymer resins can consist of polypropylene, polypropylene copolymers, polyethylene terephthalate, ethylene copolymers and the like. In addition, various pigment concentrates, such as polypropylene-based TiO$_2$, and others are used to provide coloration to the coating layer. Other functional additives, such as stabilizers, nucleators, anti-microbial additives, friction modifiers, clarifiers, etc. can also be used to impart special chemical and physical properties to the resulting coating layer such as hardness, scuff/scratch resistance, brittleness, stain resistance, UV resistance, etc.

Figure 1:
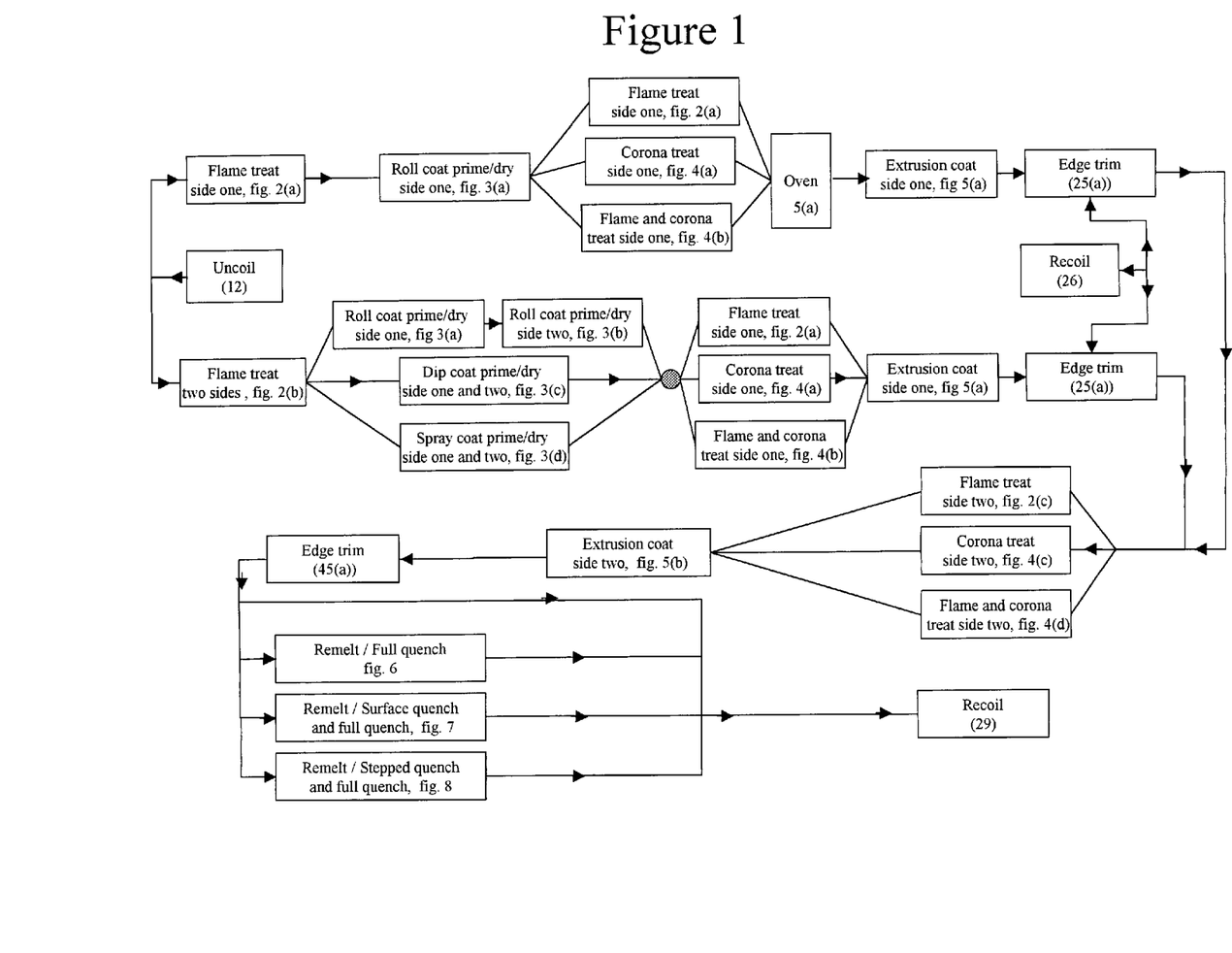
FIG. 1 is a diagram depicting a preferred embodiment of the process of the present invention.

In this embodiment, strip 11 exiting the extruder/die station as a one-side primed and extrusion coated product with suitable coating layer adhesion and coating layer surface appearance for selected applications is sent to edge trim 25a (See FIG. 1) and then sent to coiling reel 26 (See FIG. 1).

Example 2

Processing for Example 2 is identical to that in Example 1 up to and including the extruder/die station. In Example 2, however, following exit of strip 11 from stripper roll 25 (See FIG. 5(a)), the one-side primed, extrusion coated, and side-trimmed strip 11 is sent through re-melt oven 27 (See FIG. 6) which is preferably an induction oven used to re-melt the polymer coating layer to a temperature of 350° to 550° F. but preferably between 420° to 510° F. This allows the polymer coating layer to flow and fill voids and depressions in the original coating layer and results in an improved surface finish. This step characterizes the final adhesion characteristics of the primer to the strip and the coating layer to the primer.

After at least a one second delay, the re-heated strip 11, proceeds to a quench step 28 in which a fluid such as water or other compatible heat transfer fluid is used to cool the primer/polymer/strip combination. Preferably, the heat transfer fluid is directed to provide laminar flow 29 with respect to the moving strip 11 to provide an enhanced final polymer appearance and adhesion quality. The temperature of the quench liquid between 30° to 120° F. but preferably between 60° and 80° F. Because final appearance and adhesion attributes of the coating layer are achieved using the described re-melting/quenching process, a chill roll 24 (See FIG. 5) is not necessary to have a highly polished surface but rather can range in surface roughness from an Ra of 2 uin to as high as an Ra of 50 uin.

In this embodiment, strip 11 exiting the re-melt/quench station as a one-side primed and coated/post treated product suitable for certain advanced applications is then sent to re-winder 29 (FIG. 1).

Example 3

Figure 2B:
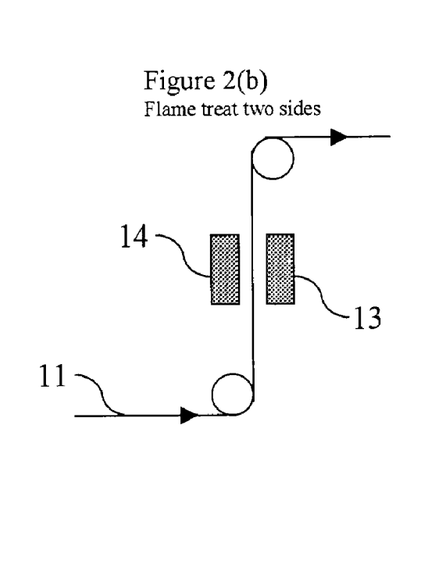

Material resulting from Example 3 processing consists of two-side primed/one-side polymer coated product which is not subjected to post treatment/quench. In this embodiment, strip 11 coming off uncoil reel 12 is transported through a pre-treatment station consisting of dual flame treaters located to simultaneously treat both sides of the strip. This arrangement is shown in FIG. 2(b) were the flame treaters are designated as 13 and 14. The operating conditions for flame treater 14 is identical to the operating conditions of flame treater 13 which is identical to that described in Example 1.

Figure 3A:
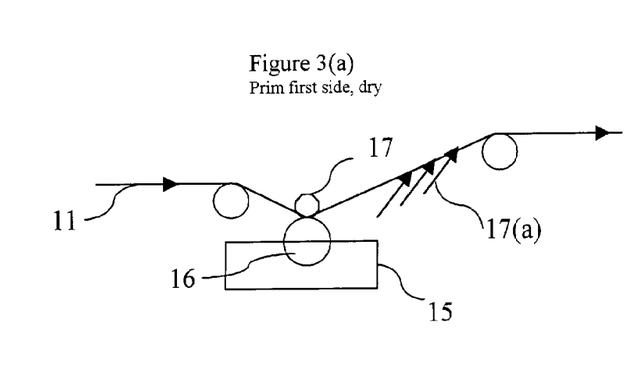
FIGS. 3(a), 3(b), 3(c) and 3(d) respectively reflect preferred embodiments of a step in the process in which a first side of a metal sheet is primed and dried, a second side is primed and dried, both sides of a metal sheet are primed by dipping and dried, and both sides of a metal sheet are primed by spraying and dried.
Figure 3B:
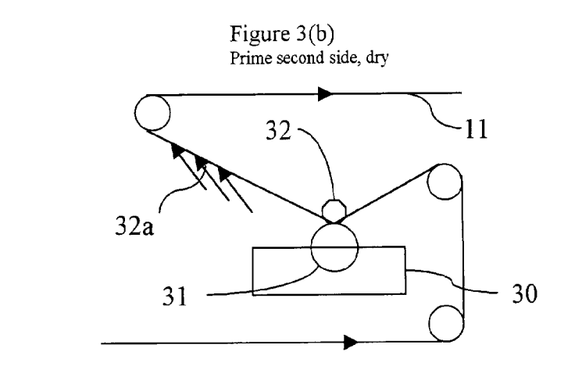

Following pre-treatment, in one embodiment, strip 11 then enters a primer station See FIG. 3a, where a liquid primer coat is applied to one side of the strip using a gravure cylinder or smooth roll applicator 16/impression roll 17 arrangement identical to that described in Example 1. From this primer section, however, strip 11 which has been one-side primed, enters a second primer section as depicted in FIG. 3b where the second side of the strip is primed with either the same or a different water base primer than that applied to the first side.

Figure 3C:
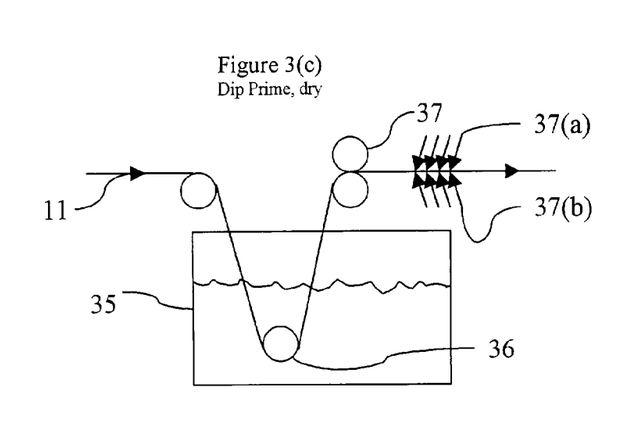
Figure 3D:
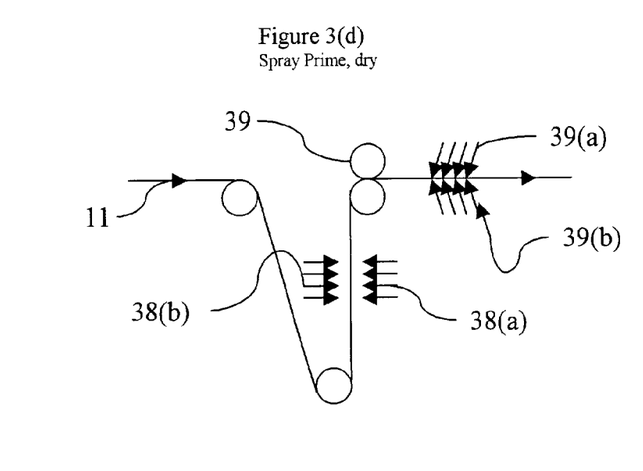
Figure 7:
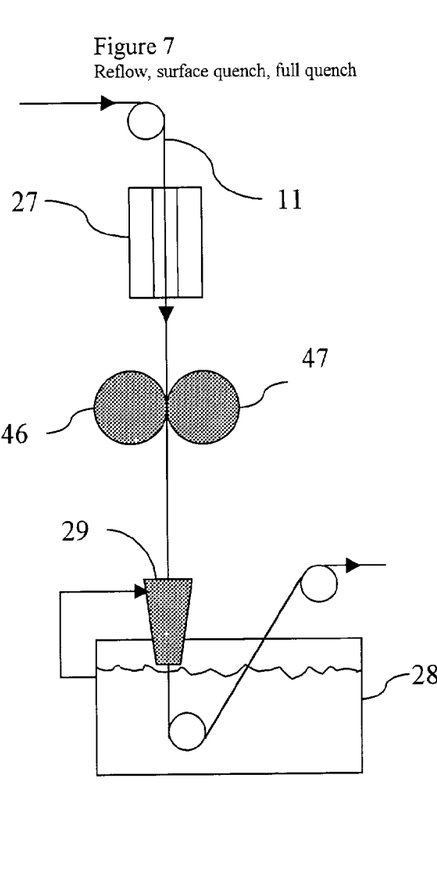
FIG. 7 reflects a preferred embodiment of a step in the process in which a coated sheet of metal with surface conditioned rolls imparts a mechanical bond and texture before final quench.

In another preferred embodiment, a water-based primer coat selected from those listed in Example 1 is applied to both sides of the strip using a dip-and-squeegee technique as depicted in FIG. 7. In FIG. 3c, strip 11 is diverted to sink roll 36 in holding tank 35 which contains the liquid primer coating layer and then to squeegee roll arrangement 37 followed by ambient or hot air drying 37(a) and 37(b). In yet another preferred embodiment, the water-based primer coat is applied to strip 11 using spray arrangement 38(a) and 38(b) shown in FIG. 3(d) followed by squeegee roll arrangement 39 and then by ambient or hot air drying 39(a) and 39(b).

After ambient or hot air drying as depicted in FIGS. 3(a-d), from that point forward the strip is treated as described in Example 1 resulting in a two-side primed, one-side coated product which is suitable for certain applications with no further post-treatment.

Example 4

Figure 6:
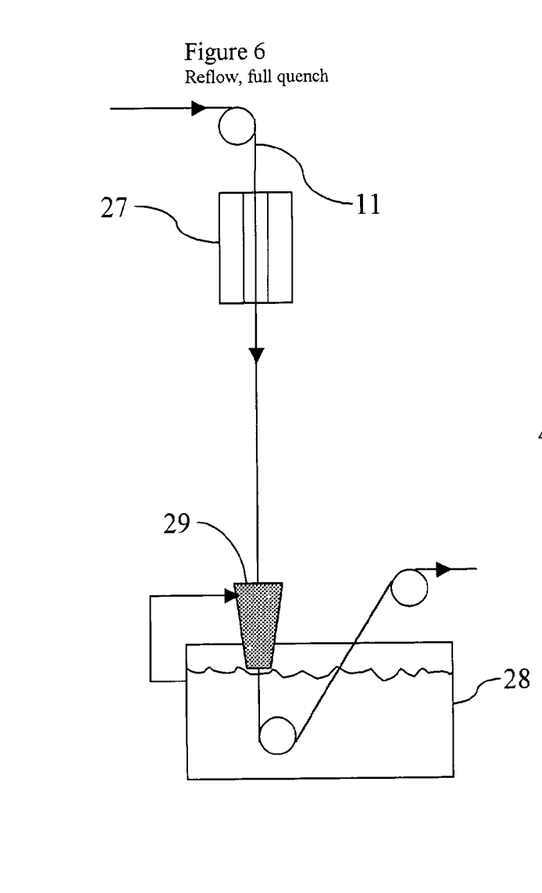
FIG. 6 reflects a preferred embodiment of a step in the process in which a coated sheet of metal is reheated and quenched.

Processing for Example 4 is identical to that for Example 3 up to and including the extruder/die station. In Example 4, however, after exit of strip 11 from stripper roll 25 (See FIG. 5(a), the two-side primed, one-side extrusion coated strip 11 is subjected to a post-treatment station consisting of a re-melt/quench process as shown in FIG. 6 which was described in detail in Example 2. The resulting material using this embodiment consists of a two-side primed, one-side extrusion coated, post-treated product.

Example 5

Figure 2C:
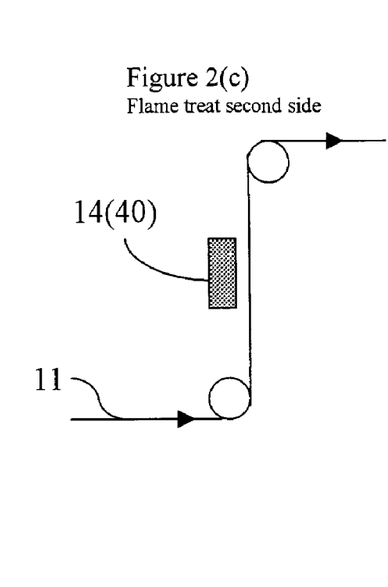
Figure 4C:
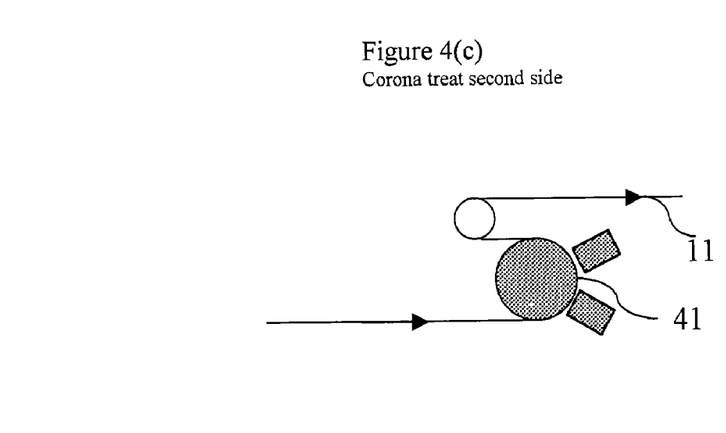
Figure 4D:
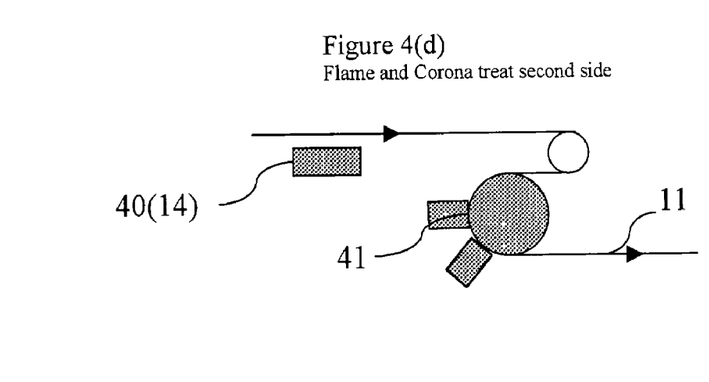

Processing for Example 5 is identical to that in Example 4 up to and including the first extruder/die station shown in FIG. 5(a). Upon leaving stripper roll 25, two side primed and one-side coated strip 11 passes through an edge trimming operation and then is entrained over rolls to position the second primed, uncoated side for activation using either flame treater 14 (See FIG. 2(c)), Corona discharge unit 41 (FIG. 4(c)), or by using a combination of flame treater 40 and Corona discharge unit 41 in tandem (FIG. 4(d)).

Figure 5B:
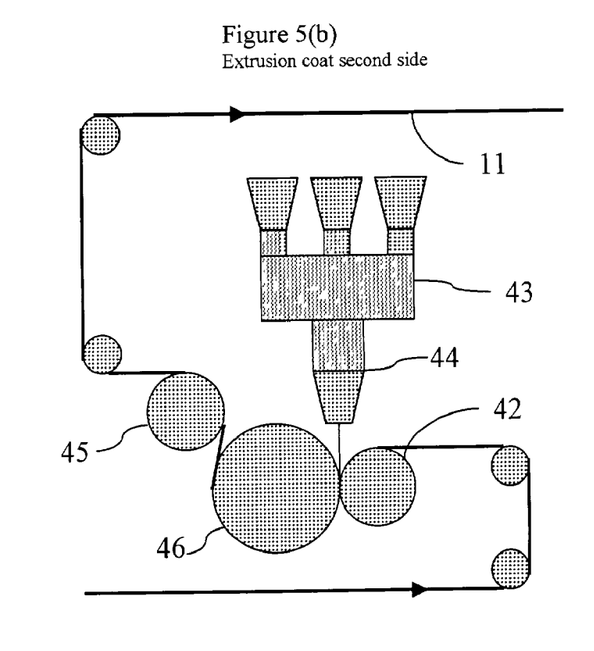

After passing through Corona discharge unit 41, strip 11 enters extruder 43 and die 44 (See FIG. 5(b)) where the second primed surface has applied thereto a polymer coating layer. Specifics concerning this operation are identical to those described in detail for the coating layer stations in Examples 1, 2, 3, and 4. Polymer coating layers/layers applied in the second extruder coating layer station can be the same or different than the coating layer applied on the first pass depending on final product application requirements.

Strip 11 exiting the second extruder station is post-treated in an identical manner as described following the coating layer stations in Examples 2 and 4 as shown in FIG. 6. The resulting material using this embodiment consists of a two-side primed, two-side extrusion coated, post-treated product.

Example 6

Figure 8:
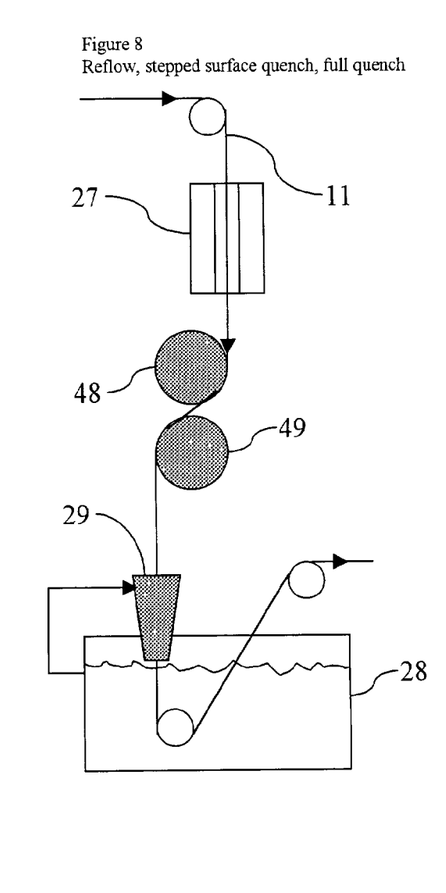
FIG. 8 reflects a preferred embodiment in which a coated sheet of metal with surface conditioned rolls imparts a mechanical bond and texture before final quench.

Processing for Example 6 is identical to that for Example 5 up to and including passage of two-side primed and two-side coated strip 11 through re-melt oven 27 (FIG. 6). In one embodiment, following re-melt oven 27, strip 11 is passed through chilled rolls 46 and 47 (FIG. 7) positioned to quench the surfaces of the polymer coating layer on both sides of the strip simultaneously prior to a full quench in quenching station 28. The temperatures of chilled rolls 46 and 47 are maintained less than the temperature of the re-melted polymer film and can be greater or preferably less than the temperature of the full quench tank fluid. In another embodiment, following re-melt oven 27, strip 11 is passed around chilled rolls 48 and 49 (FIG. 8) positioned to effect a stepped quench on the polymer coating layer on each side of the strip before a full quench in quenching phase 28.

The material resulting from Example 6 consists of a two-side primed, two-side extrusion coated, post-treated product with either simultaneous surface quenching of the coating layers before a full quench or stepped surface quenching of the coating layers before to a full quench.

Example 7

In one preferred embodiment, the polymer coating layer is PET. In this embodiment, the metal strip is heated to at least 250° F. immediately before extrusion application of the PET through the extruders. In this embodiment, the extruder (s) has an edge containment system for the PET that is applied to the metal strip.

What is claimed is:

1. A continuous process for applying a polymer coating layer on a metal strip comprising the following steps:
   a) moving said metal strip through a processing line,
   b) pretreating a major surface of said metal strip with a first oxidizing flame,
   c) applying a thin liquid primer coat of 1.5 to 7.5 mg/ft$^2$ to said pretreated major surface wherein said thin liquid primer coat incorporates a corrosion inhibitor which is an organo-chromium or chromium compound to prevent oxidation on any said major surface of said metal strip,
   d) activating the exposed surface of said thin liquid primer coat with a second oxidizing flame and optionally a corona discharge,
   e) heating said metal strip to a first temperature,
   f) using an extrusion coating process to melt and apply a polymer extrudate onto said activated exposed surface of said thin liquid primer coat thereby creating a coated metal strip,
   g) wherein said extrusion coating process includes contacting said coated metal strip with a cooling roll,
   h) wherein said cooling roll has a temperature less than said polymer extrudate, and
   i) wherein said cooling roll has a surface finish suitable for imparting final desired surface attributes to the outside surface of said polymer extrudate,
   whereby said coated metal strip has desired coating characteristics and has satisfactory adhesion between said metal strip, said thin liquid primer coat, and said polymer extrudate.

2. A process as set forth in claim 1 comprising the additional steps of:
   a) heating said coated metal strip to a second temperature wherein said second temperature is at least the melting temperature of said polymer extrudate, and
   b) rapidly cooling said coated metal strip.

3. A continuous process for applying a polymer coating layer on both sides of a metal strip comprising the following steps:
   a) moving said metal strip through a processing line,
   b) pretreating a first major surface of said metal strip with a first oxidizing flame and pretreating a second major surface of said metal strip with a second oxidizing flame,
   c) applying a first thin liquid primer coat of 1.5 to 7.5 mg/ft$^2$ to said pretreated first major surface and applying a second thin liquid primer coat of 1.5 to 7.5mg/ft$^2$ to said pretreated second major surface wherein at least one of said first thin liquid primer coat and said second thin liquid primer coat incorporates a corrosion inhibitor which is an organo-chromium or chromium compound to prevent oxidation on any said major surface of said metal strip,
   d) activating the exposed surface of said first thin liquid primer coat and the exposed surface of said second thin liquid primer coat using a third and fourth oxidizing flame respectively, and optionally a corona discharge,
   e) heating said metal strip to a first temperature,
   f) using a first extrusion coating process to melt and apply a first polymer extrudate onto said activated exposed surface of said first thin liquid primer coat, and using a second extrusion coating process to melt and apply a second polymer extrudate onto said activated exposed surface of said second thin liquid primer coat thereby creating a coated metal strip,
   g) wherein said first extrusion coating process includes contacting said first polymer extrudate with a first cooling roll having a temperature less than the melting temperature of said first polymer extrudate and said first cooling roll has a surface finish suitable for imparting final desired surface attributes to the outside surface of said first polymer extrudate, and
   h) said second extrusion coating process includes contacting said second polymer extrudate with a second cooling roll having a temperature less than the melting temperature of said second polymer extrudate and said second cooling roll has a surface finish suitable for imparting final desired surface attributes to the outside surface of said second polymer extrudate, whereby said coated metal strip has desired coating characteristics and has satisfactory adhesion between said metal strip, each of said thin liquid primer coat, and each of said polymer extrudate.

4. A process as set forth in claim 3 comprising the additional steps of:
   a) heating said coated metal strip to a second temperature wherein said second temperature is at least the melting temperature of either of said polymer extrudate, and
   b) rapidly cooling said coated metal strip.

5. A process as set forth in claims 2 or 4, wherein said second temperature is between 265° F. to about 550° F. and said rapid cooling of said coated metal strip is performed by additional sequential cooling rolls to control the amount of crystallinity in any of said polymer extrudate.

6. A process as set forth in claims 1 or 3, wherein said processing line moves said metal strip at speeds between 150 feet per minute to 3,000 feet per minute inclusive.

7. A process as set forth in claims 1 or 3, wherein said metal strip is selected from the group consisting of electrolytic tinplate, tin free steel, blackplate, zinc coated steel, aluminum coated steel, steel coated with combinations of zinc and aluminum, nickel coated steel, stainless steel, hot rolled strip, cold rolled strip, and nonferrous metal strip.

8. A process as set forth in claims 1 or 3, wherein any of said thin liquid primer coat is applied to said metal strip using a dip and squeegee method, a spray and squeegee method, air suspension deposition method, or transfer roll coating method, and then followed by drying of said thin liquid primer coat.

9. A process as set forth in claims 1 or 3, wherein any of said thin liquid primer coat comprises a thermoplastic polymer or thermoset polymer dissolved in a carrier preferably consisting of water.

10. A process as set forth in claims 1 or 3, wherein any of said thin liquid primer coat comprises polyethylenimine, polyethylene acrylic acid, ethylene vinyl acetate, polyvinylidene chloride, polyacrylics, polyesters, polyurethanes, organofunctional amines, or polyamides.

11. A process as set forth in claims 1 or 3, wherein said corona discharge operates in a range between 5 to 30 watts/ft$^2$/minute.

12. A process as set forth in claims 1 or 3, wherein any of said extrusion coating process heats any of said polymer extrudate to a temperature necessary for extrusion coating and any of said cooling roll is maintained at a temperature between 60° F. to 190° F.

13. A process as set forth in claims 1 or 3, wherein any of said extrusion coating process incorporates an extrusion die with a distance of 3" to 12" between said extrusion die and the contact point between said metal strip and any of said polymer extrudate.

14. A process as set forth in claims 1 or 3, wherein any of said extrusion coating process utilizes a nip roll that is a polymer covered steel roll which presses against any of said cooling roll.

15. A process as set forth in claim 1 or 3, wherein a second corona discharge is applied to the outside surface of any of said polymer extrudate to enhance post decoration quality.

16. A process as set forth in claims 1 or 3, wherein any of said polymer extrudate consists primarily of polyethylene terephthalate and any of said extrusion coating processes incorporates an edge containment system.

17. A process as set forth in claims 1 or 3, wherein any of said polymer extrudate comprises at least one polymer selected from the group consisting of polyethylene, copolymers of polyethylene polypropylene, copolymers of polypropylene, copolymers of polyethylene and polypropylene, polybutylene, copolymers of polypropylene and polybutylene, polyethylene terephthalate, copolymers of polyethylene terephthalate, random copolymer, nylon, and copolymers of nylon, and, an optional adhesive admixed with such selected polymers.

18. A process as set forth in claim 17 wherein any of said polymer extrudate includes one or more colorants, nucleators, anti-microbial additives, friction modifiers, and clarifiers.

19. A process as set forth in claim 17 wherein any of said polymer extrudate incorporates up to three layers, and a first layer incorporates a polypropylene homopolymer with a grafted maleic anhydride component or polyethylene with a grafted maleic anhydride component, wherein said first layer is adjacent to said thin liquid primer coat.

20. A process as set forth in claim 19 wherein a second layer is selected from the group consisting of polypropylene homopolymer, polypropylene random copolymer, a blend of polypropylene homopolymer and polypropylene random copolymer, polyamides, ethylene vinyl alcohol, polyethylene terephthalate, polyethylene terephthalate copolymers, and blends of polypropylene or polyethylene terephthalate, and thermoplastic polymers, wherein said second layer is adjacent to said first layer.

21. A process as set forth in claim 20 wherein a third layer is selected from the group consisting of polypropylene homopolymer and polyethylene random copolymer combined with polymeric and non-polymeric components having at least one chemical or physical property to provide hardness, scuff resistance, scratch resistance, brittleness, stain resistance, or UV resistance, wherein said third layer is adjacent to said second layer.

\* \* \* \* \*